United States Patent [19]

Miyagawa

[11] Patent Number: 4,717,805
[45] Date of Patent: Jan. 5, 1988

[54] RESISTANCE WELDING CONTROL WITH MENU TYPE USER INTERFACE

[75] Inventor: Kimio Miyagawa, Kashiwa, Japan

[73] Assignee: Miyachi Electronic Company, Noda, Japan

[21] Appl. No.: 907,681

[22] Filed: Sep. 15, 1986

[30] Foreign Application Priority Data

Dec. 10, 1985 [JP]  Japan ................................. 60-277305

[51] Int. Cl.$^4$ ............................................. B23K 11/24
[52] U.S. Cl. ..................................... 219/108; 219/110
[58] Field of Search .............. 219/114, 110, 108, 117.1

[56] References Cited

U.S. PATENT DOCUMENTS

| | | | |
|---|---|---|---|
| 4,317,980 | 3/1982 | Goodrich et al. | 219/110 |
| 4,456,809 | 6/1984 | Jones et al. | 219/114 |
| 4,628,176 | 12/1986 | Kojima et al. | 219/110 |

OTHER PUBLICATIONS

Medar Catalog excerpt for "Legend Resistance Weld Control", 7/1983.

*Primary Examiner*—Clifford C. Shaw
*Attorney, Agent, or Firm*—Wenderoth, Lind & Ponack

[57] ABSTRACT

Disclosed is an user interface with a resistance welding control which provides a visual presentation of character data unlikely to lead misinterpretation on user's part on a frame-by-frame basis using a menu and conversation system and can handle as many welding schedules as there are with a single unit. Memory means stores character data so as to form different frames for predetermined item. In respone to certain user's request, any one of the frame is immediately called upon display means to that the user may enter necessary data of welding conditions associated with the selected item. While being visually presented on the screen, the entered data will be written into the memory means as part of the selected item.

5 Claims, 15 Drawing Figures

Fig.2

```
[MENU]
➔CONTROL NO./DATE
➔START SW MODE
➔MODE SELECT
➔SCHEDULE
➔CURR CHANGE %
➔STEP UP COUNT
➔MONITOR
```

Fig.3

```
-START SW MODE = 0

0:START SIGNAL = START B1.B2.B3.B4
  SCHEDULE NO. = START NO.

1:START SIGNAL = START B1
  SCHEDULE CODE= START B2.B3.B4
```

Fig. 4

```
-MODE SELECT
MAX CURR CAPACITY   23KA
CONSTANT CURR       ON
CURR STEP UP        OFF
LOCK SEQUENCE       ON
RE-WELD             OFF
CURR ERROR LIMIT  + 05% - 03%
FULL WAVE CHECK     OFF
```

Fig. 5

```
-SCHEDULE = 1

SQZ  WE1  COOL  WE2  HOLD  OFF
TIME      35   02   02    15   05    02   CYC
UP SLOPE       0          2                CYC
CURR           10.3       11.5             KA(STEP1)
PULSATION           I------I ×1
```

Fig. 6

```
-CURR CHANGE %  SCHEDULE = 1

STEP1   100 %FIXED
STEP2   105 %
STEP3   110 %
STEP4   115 %
STEP5   120 %
```

Fig. 7

```
-STEP UP COUNT (TOTAL ALL SCHEDULES)

STEP1    00009
STEP2    00120
STEP3    02000
STEP4    02000
STEP5    35000
```

Fig. 8

```
-MONITOR

STEP=2   WELD COUNT=00345

SCHEDULE=8

WELD1  CURR=10.5KA
WELD2  CURR=12.0KA
```

Fig. 9

```
 !!!TROUBLE!!!

UNDER LIMIT OF CURRENT ERROR
CODE8
```

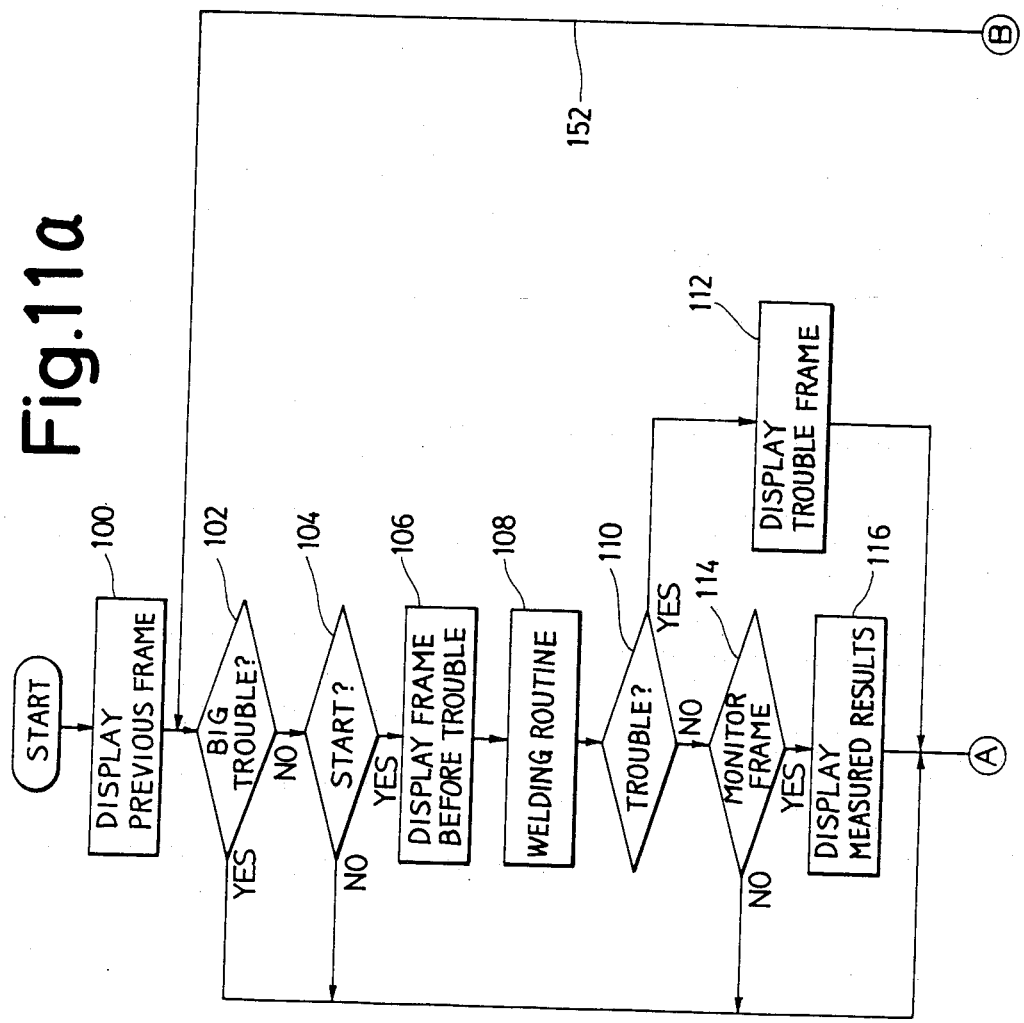

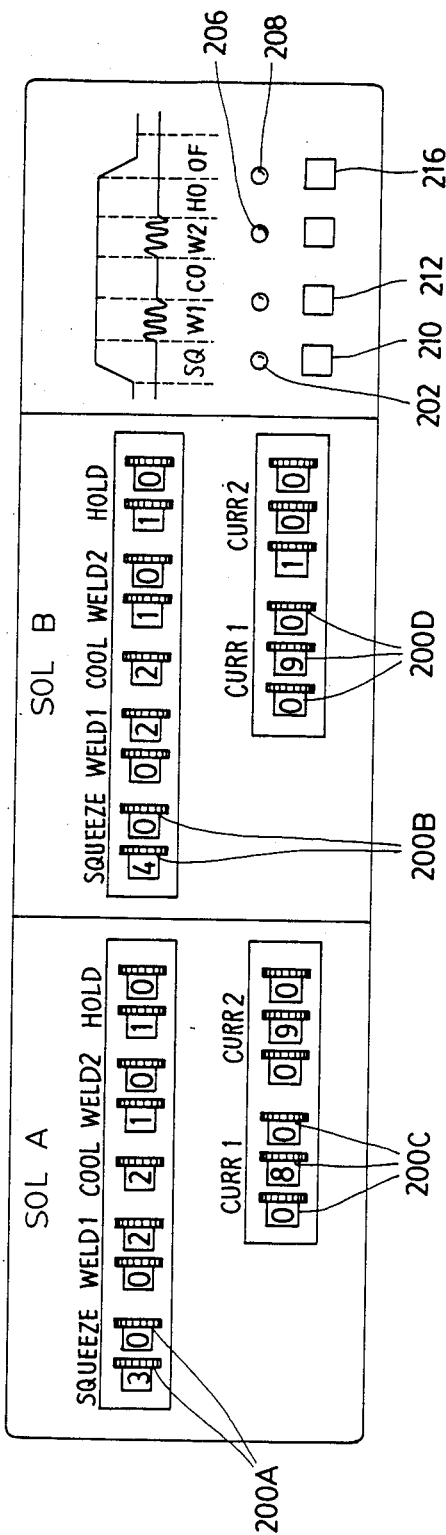
Fig. 12 "PRIOR ART"

Fig.13 "PRIOR ART"
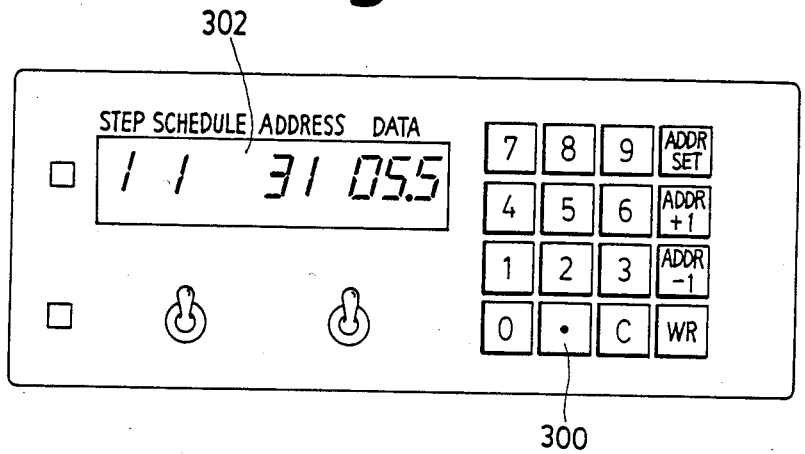
Fig.14 "PRIOR ART"
| WELDING CONDITION | ADDRESS | | | | DATA RANGE |
|---|---|---|---|---|---|
| | SOLENOID 1 | | SOLENOID 2 | | |
| | START 1 | START 3 | START 2 | START 4 | |
| SQUEEZE | 10 | 30 | 20 | 40 | 0 ~ 200 (CYCLE) |
| WELD 1 | 11 | 31 | 21 | 41 | |
| COOL | 12 | 32 | 22 | 42 | |
| WELD 2 | 13 | 33 | 23 | 43 | |

RESISTANCE WELDING CONTROL WITH MENU TYPE USER INTERFACE

BACKGROUND OF THE INVENTION

This invention relates to a resistance welding control, and more particularly to an apparatus for use with such a welding control which provides a menu and conversation type interface on frame-by-frame basis of visual presentation, making it possible for a one unit to handle a large number of welding schedules.

A resistance welding control generally includes a panel for the purpose of setting welding conditions, indicating measured values of welding properties, and giving predetermined warnings.

FIG. 12 shows a front panel of a resistance control in the prior art. Digital switches in the form of thumwheel switches 200A through 200D are provided to set and indicate welding conditions such as squeeze time (SQUEEZE), first welding current time (WELD 1), cool time (COOL), second welding current time (WELD 2), hold time (HOLD), first welding current value (CURR 1), second welding current value (CURR 2) and the like. Lamps 202 through 208 are used to indicate welding stages and warnings. Current range changeover switches, reset switches and other switches are designated by reference numerals 210 through 216. The illustrated front panel can set and indicate two different welding schedules (SOL A and SOL B) at a time.

In U.S. Pat. No. 4,301,351 to James K. Mathews issued on Nov. 17, 1981, there is a disclosed a similar front control panel with thumwheel switches in which only one welding schedule can be set at a time.

FIG. 13 shows a front panel of a resistance welding control in another prior art. This is of a key input type. Data of welding conditions are input and set by means of a ten key type keyboard 300, and are displayed by means of a seven-segment display 302. Respective setting conditions such as squeeze and first welding times are visually presented by numeric addresses. For example, ADDRESS "31" is shown to represent a first welding current time. The list of such addresses is printed on a manual "ADDRESS TABLE", as shown in FIG. 14. By referring to this address table, an operator enters numeric values for setting conditions and interprets what is displayed.

The above mentioned two type resistance welding controls have respective disadvantages as follows.

While the resistance welding control in FIG. 12 has a front panel from which an operator can understand the whole welding conditions and situations at a glance, the number of welding schedules which can be set at a time with this arrangement is limited to two at most, as indicated in FIG. 12. Accordingly, in a resistance welding process or the like by means of, for example, a welding robot for successively executing a series of welding schedules set therein at intervals (which are too short for an operator to operate digital switches for setting), a single type resistance welding control is unable to keep up with the speed and a large number of such welding control are needed with the consequence of increase in cost and space.

With the resistance welding control in FIG. 13, some welding conditions are presented in the form of numeric addresses so that an operator finds it difficult to understand what is meant thereby. Referring to ADDRESS TABLE (FIG. 14) is troublesome. Even those who are familiar with the address indication would often misread the information.

BRIEF SUMMARY OF THE INVENTION

In view of the above mentioned problem of the prior art, it is therefore an object of the present invention to provide an apparatus for use with a resistance welding control which provides a visual presentation of character data easy to understand on a frame-by-frame basis in accordance with a menu and conversation system and can handle as many welding schedules as there are with a single unit.

In accordance with the present invention, there is provided an improved apparatus for use with a resistance welding control for setting welding conditions, indicating measured values of welding current, welding time and other welding properties, and providing predetermined warnings. The apparatus comprises display means which receives and then visually displaying character data, memory means which stores character data of welding conditions, objects for measurement, warning messages and the like, frame by frame for each of predetermined items, a first key means for calling a menu frame for providing a list of predetermined frame items on the screen of the display means, a second key means for selecting any one of the frame items hit by the screen cursor, and a third key means for incrementing or decrementing numeric values at a position on the screen hit by the screen cursor so as to set data representing welding conditions.

The apparatus further comprises a control means which is responsive to actuations of each of the first, second, and third key means for reading out character data associated with a selected frame item from the memory means so as to pass the character data to the display means for visual presentation thereof and for writing data representing welding conditions input by the third key means into the memory means.

With the above arrangement, welding conditions, objects for measurement, warning messages and the like are not permanently present on a front panel but are stored, as character data, in the memory means. In response to a request, the control means reads out character data forming a frame from the memory means to the display means for visual presentation thereof.

Accordingly, it is possible to add as many frames as there are required. For example, a single display panel can handle a great number of welding schedules to be successively executed at short intervals by displaying one after another of those frames which are associated with the respective schedules.

Further, since welding conditions, measured values and the like for each of items are visually presented in the form of characters, an operator can readily understand what is meant by the visual presentation at a glance without misinterpretation.

In one embodiment, the entire data stored in the memory means is divided into several items with each item including at least one frame. The number of the frames associated with each of the items depends on the nature of the associated item in consideration of the environment, relationship between the user and the machine regarding the resistance welding field. Selectng one of the frames within the same item can be made by selecting a particular frame number when the called item is present on the display means.

In another embodiment, all items can be simultaneously called onto the display means, thus defining a "MENU" frame. From this menu, an operator can select any one of the items which he wishes to call by using the first key means including a locater device. In response to the selection by the locater device, the control means takes out the selected item from the memory means and sends the same item to the display means for visual presentation thereof.

BRIEF DESCRIPTION OF THE DRAWINGS

The foregoing and other objects, features and advantages of this invention will be apparent from the following description taken in connection with the drawings in which:

FIGS. 2 to 9 are views, respectively, of frames visually displayed on the front panel;

FIG. 12 is a front view of a front panel of a resistance weldng control in the prior art;

FIG. 13 is a front view of a front panel of a resistance welding control in the prior art; and FIG. 14 is a view of an address table used in conjunction with the resistance welding control in FIG. 13.

PREFERRED EMBODIMENT OF THE INVENTION

Figure 1:
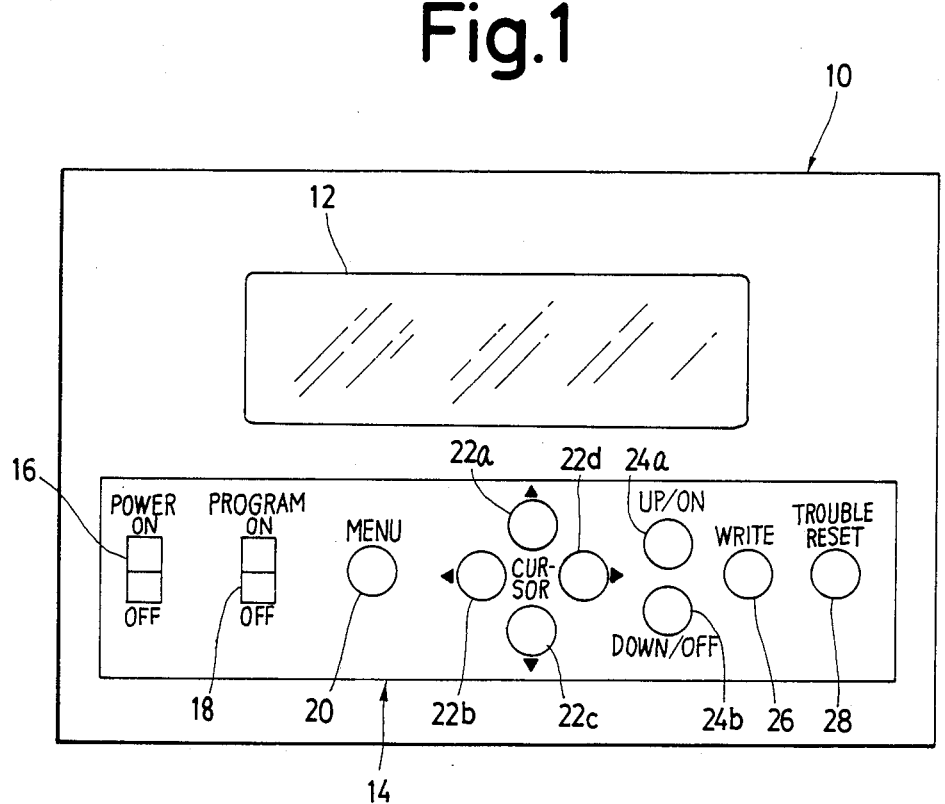
FIG. 1 is a front view of a front panel of a resistance welding control of an embodiment of the present invention.

FIG. 1 shows a front panel 10 of a resistance welding control in accordance with an embodiment of the present invention. The front panel 10 includes a flat panel display such as a liquid crystal display 12 at the central portion thereof. Disposed below the display is a keyboard 14 which comprises an array of keys as follows.

Power on/off key (POWER ON/OFF) 16,
Program on/off key (PROGRAM ON/OFF) 18,
Menu key (MENU) 20,
Cursor keys (CURSOR) 22a to 22d,
Up/on key (UP/ON) 24a,
Down/off key (DOWN/OFF) 24b,
Write key (WRITE) 26, and
Trouble reset key (TROUBLE RESET) 28.

The function of these keys and the control of the respective frames visually displayed on the liquid crystal display panel 12 will now be described with reference to FIGS. 2 through 9.

A menu frame is displayed as shown in FIG. 2 when the menu key 20 is depressed. The menu frame is a list of the items (all kinds of frames except the menu frame). The cursor keys 22a–22d may be operated to move a screen cursor onto an arrow marking of the desired item, say, "START SW MODE". At this position, the write key 26 is pressed to change the visual presentation on the panel 12 from the menu frame to a "START SW MODE" frame as shown in FIG. 3. This item is used to select a format of a four bit signal starting on a welding. In the illustrated example, selection can be made to one of two formats. When a first format is selected, all four bits B1–B4 define both a start signal and a schedule number whereas when a second format is selected, the first bit B1 indicates a start signal with the remaining three bits B2–B4 defining a schedule number. Selection of, say, the first format can be done by inputting "0" at the first line of the frame as shown in FIG. 3 and depressing the write key 26.

An item "MODE SELECT" is selected from the "MENU FRAME" in FIG. 2, to change the visual presentation to a frame "MODE SELECT" as shown in FIG. 4. This item is common to all the welding schedules. For examples, maximum current capacity (MAX CURR CAPACITY) is determined by the structure of the welding machine and the configuration of the connection involved in the system. This item is provided to set numeric values such as 23 kilo amperes (KA). These setting are done by using up/on key 24a or down/off key 24b. More specifically, after the cursor is moved to a selected position, each depression of up/on key 24a will increment the numeric value of the selected position while each depression of down/off key 24b will decrement the value. On the other hand, at positions for setting such as constant current control (CONSTANT CURR) and current step up (CURR STEP UP), the operation of up/on key 24a will set and display "ON" indicating that the relevant condition is put in use while the operation of down/off key 24b will be set and display "OFF" indicating that the relevant conditions is out of use.

When the item "SCHEDULE" is selected from "MENU FRAME" in FIG. 2, the display will change to a frame "SCHEDULE" as shown in FIG. 5. This item is provided to set welding conditions for each of hte welding schedules. At the first line of the frame, a schedule code or identification (here, number "1") is input for selection. Then, the respective welding specifications for the selected schedule are numerically set by up/on key 24a or down/off key 24b.

The selection of an item "CURR CHANGE %" from "MENU" frame in FIG. 2 will change the visual presentation to a frame "CURR CHANGE" as shown in FIG. 6. This item is provided to set the rate of setp-up in the welding current. The rate settings are made for each of the welding schedules (in the illustrated example, schedule code "1") by inputting numeric values by means of up/on key 24a or down/off key 24b. The step-up operation of the welding current means that the set value of the welding current automatically increase or steps up to compensate for consumption of the welding electrodes when the welding count reaches a predetermined value.

Selecting an item "STEP UP COUNT" from "MENU" frame in FIG. 2 will change the visual presentation to a frame "STEP UP COUNT" as shown in FIG. 7. This item is provided to set the timing when the above step-up should be occurred, i.e. the welding count for the respective steps.

When an item "MONITOR" is selected from "MENU" frame, the display screen will change to a frame "MONITOR" as indicated in FIG. 8. This item is provided to monitor the result of each welding schedule. Here, the measured values of the welding count (COUNT) and the first and second welding currents (WELD1 CURR, WELD2 CURR) are indicated in the display screen.

FIG. 9 shows a frame "TROUBLE" which is automatically presented on the screen by means of a trouble monitor when relevant trouble occurs. In this case, a trouble message "UNDER LIMIT OF CURRENT ERROR" along with an associated trouble code or number "8" is indicated. The following is a list of trouble.

| CODE | CONTENT |
| --- | --- |
| 1 | EMERGENCY STOP |
| 2 | MEMORY TROUBLE |
| 3 | OVER TEMPERATURE |
| 4 | SCR SHORT |
| 5 | BREAK OF TROIDAL COIL |
| 6 | NO CURRENT OR SCR FAILED TO FIRE |
| 7 | FULL WAVE |
| 8 | UNDER LIMIT OF CURRENT ERROR |
| 9 | OVER LIMIT OF CURRENT ERROR |
| 10 | END OF LAST STEP |

System Arrangement

Figure 10:
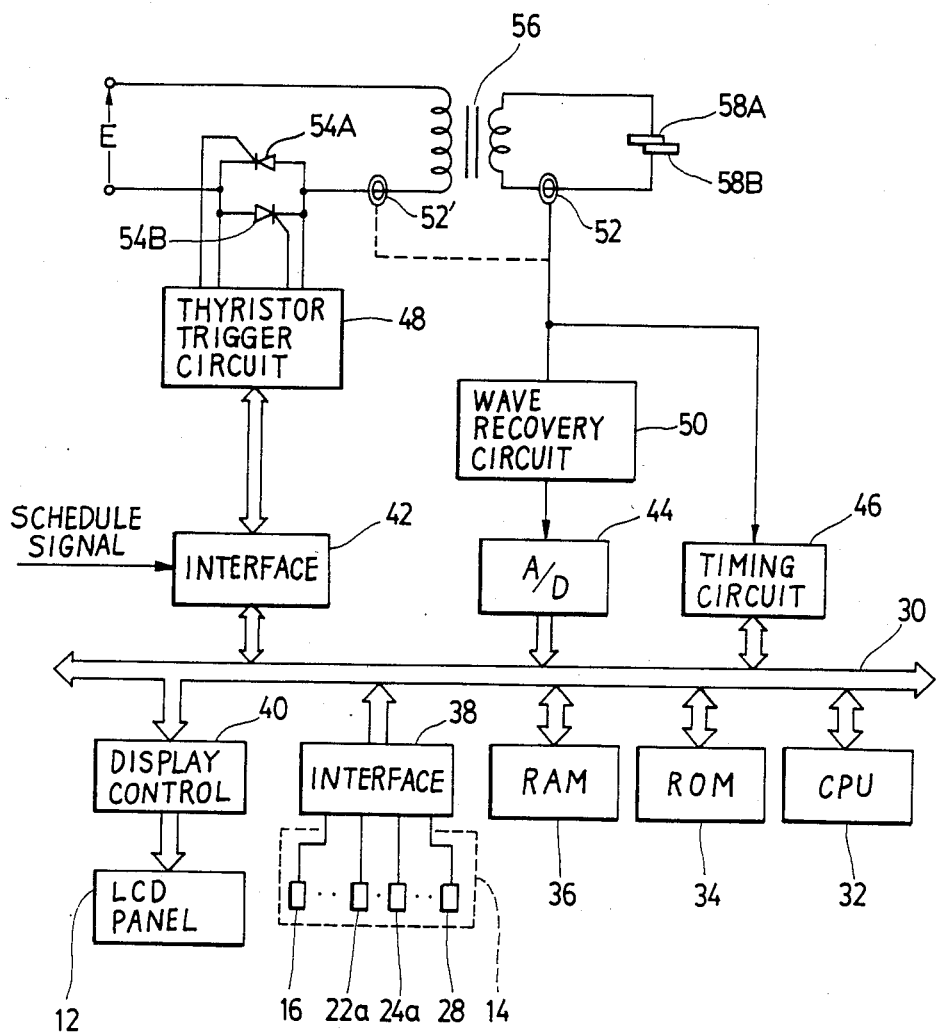
FIG. 10 is a block diagram of the resistance welding control system.

FIG. 10 shows a system arrangement of the present resistance welding control. A system bus 30 is provided for interconnection of a CPU 32, a ROM 34, a RAM 36, a keyboard interface 38, a display controller 40, an I/O interface 42, an analog to digital (A/D) converter 44 and a timing circuit 46.

CPU 32 controls the operation of the respective elements and the entire system, executes various computations such as measuring the value of the welding current and comparing measured value with the set value in accordance with control programs, display programs, key input routines and others stored in ROM 34.

ROM 34 also stores unchangeable character data of each of the frames to be operatively viewed on the liquid crystal display panel 12.

RAM 36 is used to temporally store the result of various computations by CPU 32 as well as schedule code, set values by means of keyboard 14, and character data to be operatively displayed on the liquid crystal display panel 12.

Interface 38 is coupled to the keyboard 14 on the above mentioned set and display panel and transfers input data from the keyboard 14 to CPU 32. The display controller 40 includes a buffer memory for storing character data for one frame transferred from CPU 32 and controls the liquid crystal display panel 12 to display the character data. I/O interface 42 not only passes control signals from CPU 32 to a thyristor trigger circuit 48 but also transfers a schedule or start signal indicating a request for a welding start from a welding machine or the like to CPU 32. A/D converter 44 receives a welding current in an analog form from a wave recovery circuit 50 for conversion into a corresponding digital signal which is passed to CPU 32. Timing circuit 46 not only provides timing signals to various elements but also receives a welding current picked up by means of troidal coils 52 or 52' to detect its cycle timings which are passed to CPU 32 as data for measurement of the supply period of the welding current. Reference numbers 54A and 54B designates thyristors serving as electric contactors. A welding transformer is designated by a reference numeral 56. Workpieces are denoted by reference numerals 58A and 58B.

Operation

Figure 11B:
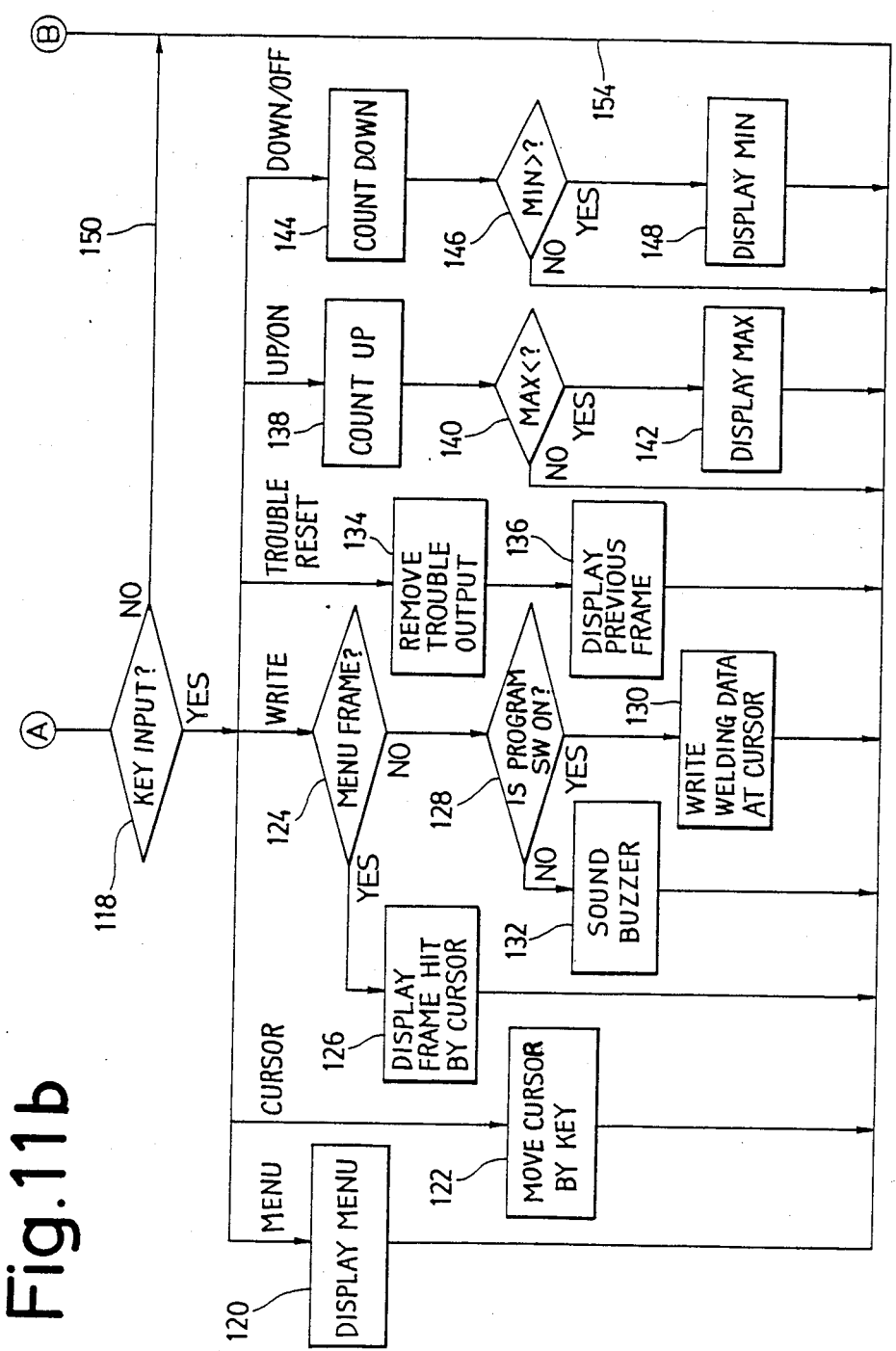
FIGS. 11a and 11together are is a flowchart of the operation of the resistance welding control.

The overall operation of the present resistance welding control will now be described by reference to a flow-chart in FIG. 11.

When the power on/off key 16 is operated to power on the system, the frame that was present on the liquid crystal display panel 12 at the time of powering off the system is displayed again on the panel (100). The data of this frame (item) has been saved in RAM 36 by a backup source. Then, a check is made as to whether any big trouble such as a break of SCR has occurred (102). If the system is normal, when the start switch of the welding machine operates so that CPU 32 receives the start signal (104), CPU 32 will conditionally change the display frame (106) before executing a welding routine (108). More specifically, if the current frame is "TROUBLE" frame (FIG. 9), the previous frame that was present before "TROUBLE" frame (one of the frames in FIGS. 2 to 8) will be called again on the panel. This frame change reflects that the system will re-start a welding operation under normal conditions. If the occurrence of trouble is detected as a result of the welding routine (measurement, computations, determinations, etc.), the display will change to "TROUBLE" frame (FIG. 9) and indicate which trouble has occurred (112). If no trouble has occurred and the current frame is "MONITOR" frame, the measured values of the executed welding schedule or the like will be indicated within "MONITOR" frame (114, 116).

The above operation repeats until an key input is received (loop designated by reference numerals 150 and 152).

When any key input is sampled, the display will change to a frame corresponding to the input key.

For example, when the menu key 20 is depressed, "MENU" frame will be called on the display panel (120).

When any of the cursor keys 22a to 22d is depressed, the screen cursor will be moved through writable positions in the direction designated by the cursor key (122).

If the write key 26 is depressed with "MENU" frame (FIG. 2) present on the display panel, this will change the visual presentation to a frame of an item hit by the cursor (124, 126). If the write key 26 is depressed when one of the frames excluding "MENU" frame is present, a check will be made as to whether the program on/off key 18 is "ON" (128). If this is the case, the data of welding conditions hit by the cursor will be written into RAM 36 at a predetermined address (130). If the key 18 is at "OFF" position, a buzzer will be sounded, thus indicating that the write request has been rejected (132).

The trouble reset key 28 is depressed when "TROUBLE" frame (FIG. 9) is present with the associated trouble existing. The operation of the key 28 will stop or reset the associated trouble relay signal (134) and changes the visual presentation to the previous frame before "TROUBLE" frame (136).

When either the up/on key 24a or the down/off key 24b is depressed for entry of data of welding conditions, numeric value of the set condition at the position of the cursor CR will be count up or down (138, 144). If the numeric value goes beyond the limit of a predetermined maximum (or minimum), the value will go back to minimum (or maximum) (140, 142, 146, 148). For those conditions determined by either "ON" or "OFF" (for example, the condition "CONSTANT CURR" in FIG. 4), either "ON" or "OFF" is visually displayed instead of counting up or down the numbers.

When the key input processing is over, the program will return to the above described operations so that the start switch will be monitored again (loop designated by reference numerals 154 and 152).

While the present invention has been described by reference to a particular embodiment which is for illustration purpose only, numerous variations, alternations and modifications can be made by a person having an ordinal skill in the art without departing from the scope of the present invention defined by the accompanying claims.

The term "character" used herein should not be limited to programs and ideograms but may include marks, codes, symbols, numerals and the like.

What is claimed is:

1. A resistance welding control for setting welding conditions, indicating measured values of welding current, welding time and other welding properties, and for providing predetermined warnings, comprising:
   a display means for visually displaying characters in a number of lines frame by frame;
   a memory means for storing character data of welding conditions, objects for measurements, warning messages and other data;
   a cursor key means for moving a screen cursor to any one of a number of predetermined positions on a two-dimensional screen of said display means;
   a first key means for calling a menu frame for providing a list of predetermined frame items on said screen of said display means;
   a second key means for selecting any one of said frame items hit by said screen cursor;
   a third key means for incrementing or decrementing numeric values at a position on said screen hit by said screen cursor so as to set data representing welding conditions;
   a control means which is responsive to actuations of each of said first, second and third key means for reading out character data associated with a selected frame item from said memory means so as to pass said character data to said display means for visual presentation thereof, and for writing data representing welding conditions input by said third key means into said memory means.

2. A resistance welding control as recited in claim 1, wherein said cursor key means comprises four keys for respectively moving said screen cursor in the upper, lower, left and right directions.

3. A resistance welding control as recited in claim 1, wherein said third key means includes a means for providing a choice of either using or not using certain welding conditions.

4. A resistance welding control as recited in claim 1, wherein said frame items include:
   a first item for selecting a format of a start signal for starting welding;
   a second item for setting welding conditions for a welding schedule;
   a third item for setting a step-up rate of a welding current;
   a fourth item for setting a point of time when said step-up should occur; and
   a fifth item for monitoring a result of each welding schedule.

5. A resistance welding control as recited in claim 1, wherein a frame is displayed so as to indicate a trouble message when a relevant trouble occurs.

* * * * *